July 6, 1965  C. S. JEFFRIES, JR  3,193,195
NAVIGATIONAL INSTRUMENT
Filed Sept. 17, 1962  4 Sheets-Sheet 1

INVENTOR
*Charles S. Jeffries, Jr.*

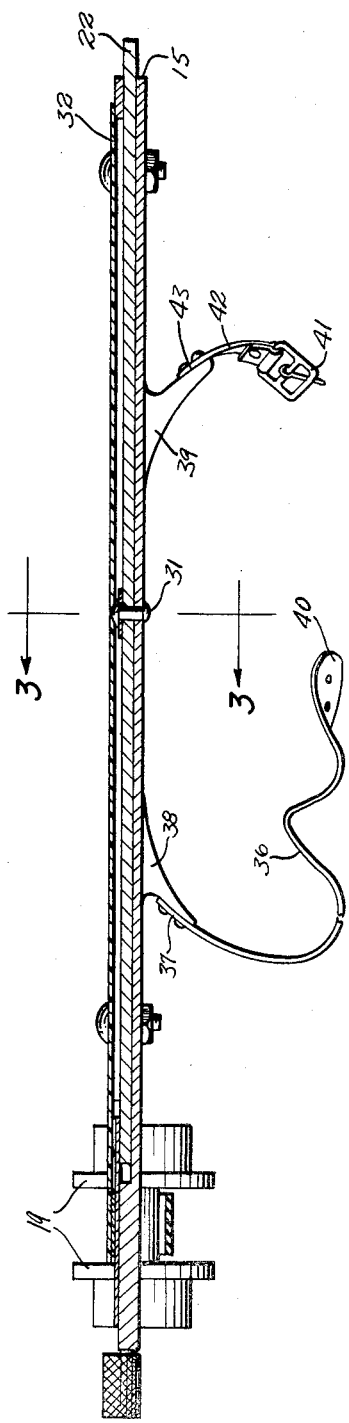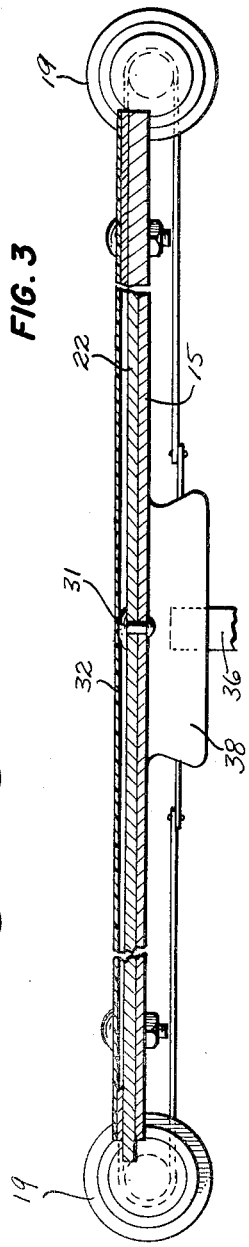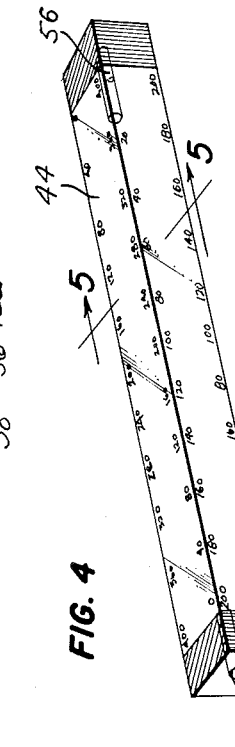
INVENTOR
Charles S. Jeffries, Jr.

July 6, 1965   C. S. JEFFRIES, JR   3,193,195
NAVIGATIONAL INSTRUMENT
Filed Sept. 17, 1962   4 Sheets-Sheet 3

INVENTOR
Charles S. Jeffries, Jr.

July 6, 1965

C. S. JEFFRIES, JR 3,193,195

NAVIGATIONAL INSTRUMENT

Filed Sept. 17, 1962

INVENTOR

*Charles S. Jeffries Jr.*

United States Patent Office 3,193,195
Patented July 6, 1965

3,193,195
NAVIGATIONAL INSTRUMENT
Charles S. Jeffries, Jr., Corpus Christi, Tex.; Nona G. Jeffries, executrix of said Charles S. Jeffries, Jr., deceased
Filed Sept. 17, 1962, Ser. No. 223,877
5 Claims. (Cl. 235—61)

This invention relates to navigation instruments and more particularly to a navigation instrument used in the navigation of aircraft, and instruments that come under that classification of instruments known as computers.

While it is admittedly true that there are a number of good computers in one form or other for the navigation of aircraft, they all to date, have what can at times be deficiency defects that have been known or suspected to be the indirect cause of serious aircraft accidents. These defects in navigational equipment has certainly been a contributing cause of errors in aircraft navigation that has lead to crashes resulting in the large loss of life.

It is, therefore, an object of this invention to provide a navigational instrument for aircraft and the like in the form of a computer that does not require an interpolation of its results before its readings can be used.

Another object of this invention is to provide a navigational instrument that does not require the wind velocity or direction in order to compute a course therewith.

Another object of this invention is to provide a navigational instrument that uses only the "magnetic" courses whereas all other instruments must convert "true" headings to magnetic headings before the results can be used. This conversion naturally results in possible errors from time to time.

Another object of this invention is to provide a navigational instrument that does not require a reference to the ground or stars since accurate navigation is done through the use of radio aids.

Another object of this invention is to provide a navigational instrument by which the exact position may be computed at any time rater than the necessity of waiting for a certain fix or point as is common in other types of instruments for similar purposes.

Another object of this invention is to provide a navigational instrument that gives all computations in miles rather than in degrees, thus the aircraft's position is instantly derived whereas previously a conversion from degrees to miles must be made, a conversion that is both time consuming and subject to errors that are all eliminated by the use of this invention.

Another object of this invention is to provide a navigational instrument that does not require the computation of true air speed before the ground speed can be determined.

Another object of this invention is to provide a navigational instrument for aircraft that can be manufactured and retailed at a price well within the buying powers of all who have need for this type of an instrument.

Another object of this invention is to provide a navigational instrument of the class described that can be used even by a person having limited skill in the use of navigational instruments.

Another object of this invention is to provide a navigational instrument of the computer type that is strapped to the pilot's leg and thus dispenses with the need of a table or shelf for place fixing calculations.

Another object of this invention is to provide a navigational instrument that is next to indestructible and therefore is an instrument with a long useful life.

Still another object of this invention is to provide a navigational instrument that has clearly defined numerals and lines and can, therefore, be used in even the poorest of light.

Other and further objects and advantages of this invention of a navigational instrument which I personally call a "Com-Plotter" will be hereinafter described, and the novel features thereof defined in the appended claims.

Referring to the drawings:

FIGURE 2 is a sectional view taken substantially along line 2—2 of FIGURE 1 as viewed in the direction indicated by the arrows.

FIGURE 3 is a sectional view taken substantially along line 3—3 of FIGURE 1 as viewed in the direction indicated by the arrows.

FIGURE 4 is a pictorial view of that detail of this invention that is called a Magnetic scale.

FIGURE 5 is a sectional view taken substantially along line 5—5 of FIGURE 4 as viewed in the direction indicated by the arrows.

Similar reference characters refer to similar parts throughout the various figures of the appended drawings.

CONSTRUCTION OF THIS INVENTION

Figure 1:
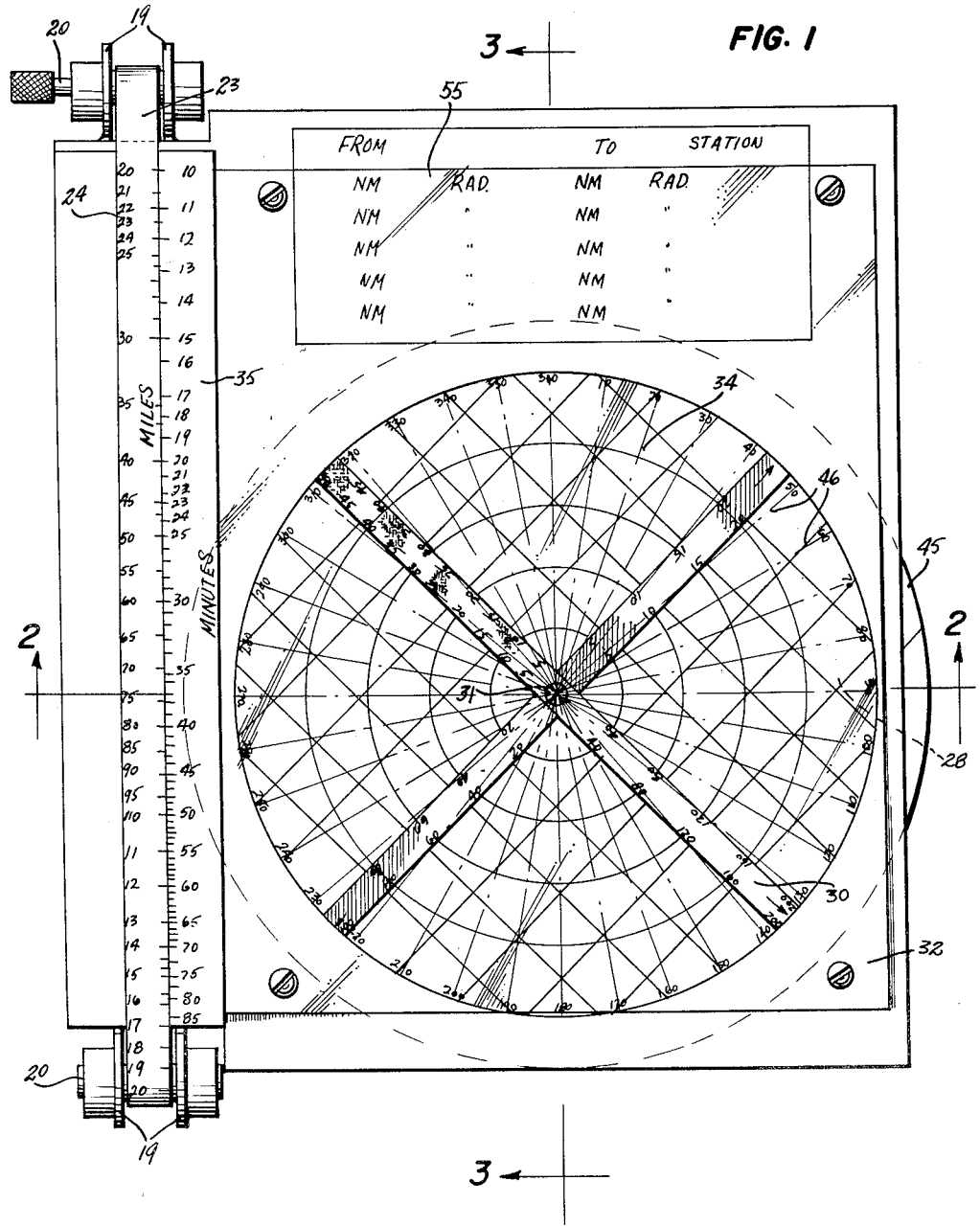
FIGURE 1 is a top plan view of this invention of a navigational instrument showing it ready for use but without the magnetic scale which has been left off for reasons of clarity.

The actual detail construction of this invention is best understood by first referring to the first six figures of the appended drawings, in which there is generally indicated by the character 15 a rigid backing plate, preferably metal and rectangular in plan form having a raised spandrel 16 in each corner thereof, two of the spandrels having rectangular cut-outs or their equivalent for the reception of the sliding computer support mechanism 17 that consists of a shaft support strap 18 that has two forked members 19 which wrap around the rotatable shaft 20 and terminates in a flat portion 21 which is secured to rectangular plate 22 that is the same size and shape as the said backing plate 15. A computer scale 23 that has miles 24 marked thereon is placed over the two shafts 20 that are part of the just described sliding computer support mechanism 17. The said computer scale 23 has its ends 25 secured to a strip of elastic material 26 thus making the said computer scale an endless one as clearly shown in FIGURE 6 of the appended drawings.

The rectangular plate 22 has a large round opening 27 in the center thereof for the rotatable reception of the rotating disk 28 which has a system of circles 29 equally spaced thereon and four scales each in the form of an equal length arm of the cross 30. A rivet 31 or similar means of securement rotatably holds the said disk on the backing plate 15.

A transparent cover plate 32 that is also the same size as the foresaid backing plate 15 has a large circle 33 engraved or otherwise marked thereon in line with the just mentioned rotating disk 28. The circle 33 also has a plurality of radially extending and equally spaced lines 34 that are engraved or otherwise marked thereon for the purpose to be described in that part of this specification that deals with the use of this invention.

Returning to the already detailed computer support mechanism 17 and the computer scale 23, it will be readily seen from examination of the appended drawings and previous statements in this specification that the scale 23 is placed on each of the shafts 20 with their support mechanism which is secured to the rectangular plate 22 and the base plate 15. The said scale of course completely encompassing the two plates. A fixed minute scale 35 is placed on the said rectangular plate 22 in such a position as to be along side of the computer scale 23 when this invention is fully assembled.

Figure 6:
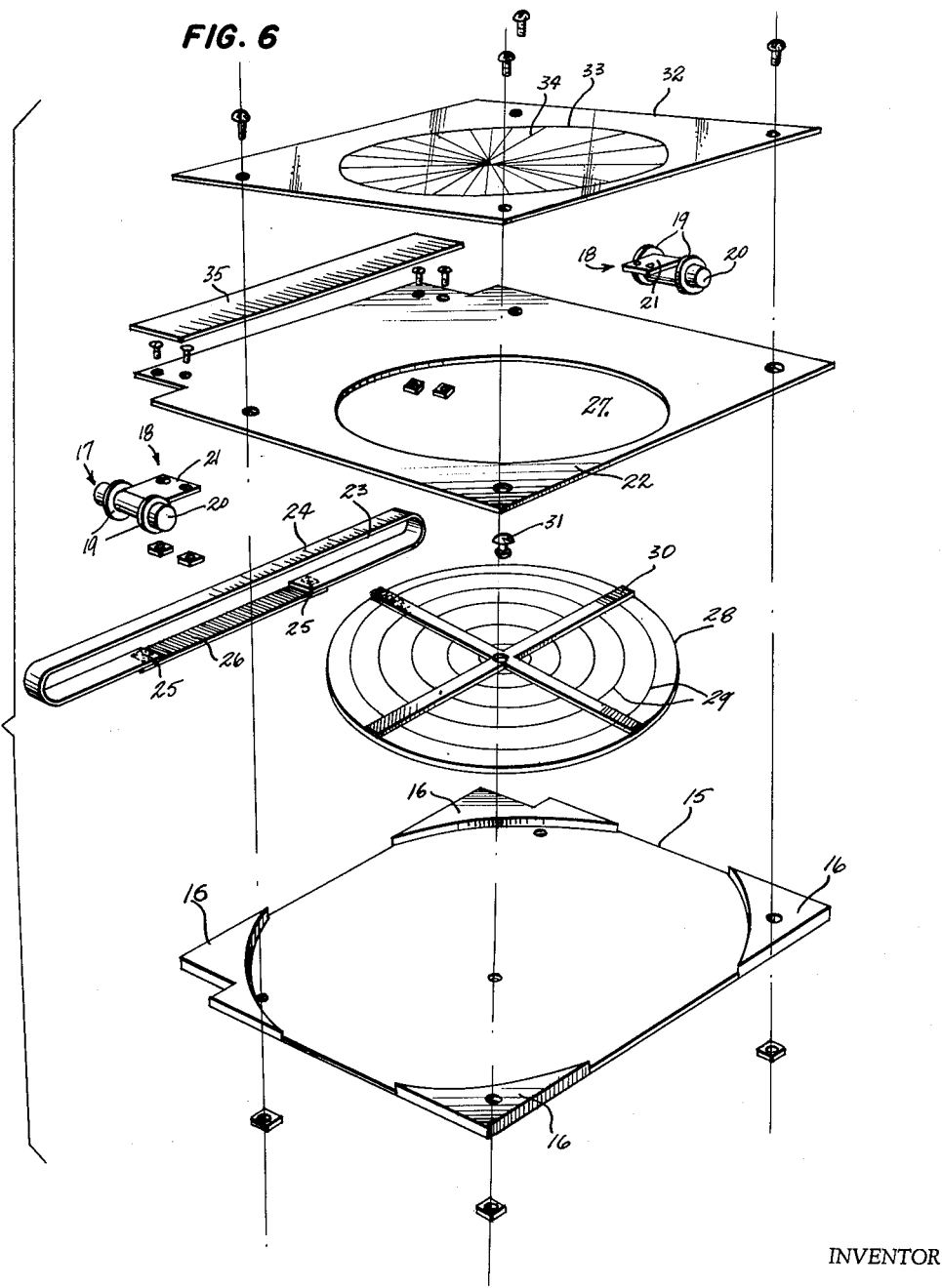
FIGURE 6 is a pictorial exploded view of this invention showing its parts in the order of assembly.

All of the previously described parts of this invention, with the exception of the computer support mechanism 17 and the just mentioned scales, are assembled in the order shown in FIGURE 6 of the appended drawings and secured by means of nuts and screws or any similar fastening devices that may be suitable for this purpose. It is, of course, understood that this novel invention is to be so assembled as to permit both the computer scale 23 and the rotating disk 28 to freely turn without danger of binding against any of the other parts of this novel invention.

The construction of this invention has now been described with the exception of a flexible strap 36 that has one end 37 secured to a fixed member 38 that is attached to the underside of the backing plate 15 and is in line with a similar member 39 that is also attached to the same backing plate. Both members 38 and 39 have their underside contoured to fit the leg of a person when the invention is placed on one's leg when sitting down and the flexible strap 36 has its outer end 40 buckled or otherwise adjustably secured to the outer end 41 of the second flexible strap noted by the reference character 42 that has its other end 43 secured to the said member 39 as it can be seen on examination of FIGURE 2 of the appended drawings.

THE USE OF THIS INVENTION: (PROCEDURE)

In order to best understand the actual use of this invention of a navigational instrument, the broad term for the same, it will be necessary to deviate slightly from patent practice and from here on speak of this invention by the name that I have personally given the same reasons that will be more fully understood and appreciated as the use of the invention proceeds.

The name by which this invention will be known in the instruction of its use is COM-PLOTTER which correctly implies is a combination computer and plotter.

Care must be taken in understanding the use of this COM-PLOTTER not to confuse the numerical values given by reason of necessity in using the same with the reference characters that indicate detail parts of the invention as described in the first part of this specification.

Before going into the actual method of use of this invention it is desirable to give the following review of the concept of this COM-PLOTTER.

The COM-PLOTTER introduces a new concept to navigation, and brings forth a new principle which permits the pilot or navigator to keep track of his position at *all* times along the route, whether flying "on" or "off" airways, to a precise degree and ease, never before possible, prior to its introduction and use. The primary thought during the development of the COM-PLOTTER was to make a device that would be far more accurate than any previous designed equipment, yet maintain simplicity, so that any pilot or navigator could readily understand its use, so as to be able to operate it almost immediately without a "formal" training course or a long period of instruction. It has been designed to work primarily with the VOR (visual omni range) and TACAN (visual omni range distance measuring equipment) navigational aids, greatly increasing the use of the DME (distance measuring equipment) and if your receiver is not DME equipped, it can be said, it's like adding a DME to your present receiver. The COM-PLOTTER can be used with ADF (automatic direction finding) in the same way as will be explained for using it with a VOR receiver, not equipped with a DME. ADF is not being treated separately, since it is almost a thing of the past. The COM-PLOTTER is simple to use. Its concept is readily understood by anyone who is familiar with OMNI (all direction) equipment. It is extremely reliable, since it has only two (2) moving parts, and is rigidly accurate. The EXACT position of the aircraft is *always* known. This one (1) thing could be very important during bad weather, low fuel state, a change of flight plan, necessary due to many things, and in many other conditions that can cause a course to be altered. Any new course can be readily refigured while in flight. The COM-PLOTTER and the necessary enroute charts are the only two (2) things that the pilot or navigator needs to navigate accurately, using radio aids, in aircraft having a VOR, TACAN, or ADF receivers, from one (1) fix (point) to another, on or off airways.

The following recommended VOR-DME (TACAN) procedures to be used with the COM-PLOTTER are presently being used by the U.S. Navy, having been submitted by the author, Charles S. Jeffries, Jr. They have been time tested by hundreds of naval pilots, and have been found to be precise and accurate in every detail. These same procedures have been modified for use by pilots and navigators of aircraft VHF, UHF, and ADF receivers *not* DME equipped.

The COM-PLOTTER, as the name implies, is a combination computer and plotter—plot your position then compute your time. It's just that simple. The following diagrams and illustrations have been designed, along with the complete explanations, to show you how you can operate this amazing device with great accuracy and speed in a very short time. Let us look at each component separately.

*The plotter.*—The plotter consists of a rotating disc 28 which has four color scales, two (2) sets of grid lines, a compass rose 34 (radial lines), and a magnetic-scale 44 which has four (4) matching color scales, to match those on the rotating disc 28. The rotating disc is rotated by turning the exposed part 45 of the disc along the right side of the COM-PLOTTER. Each color represents a different scale. For example, when working between 0–25 NM (nautical miles) in relation to a station, use the "green" scale; between 0–50 NM use the "yellow" scale; between 0–100 NM use the "red" scale; and between 0–200 NM use the "blue" scale. For the greatest accuracy use the smallest scale possible. For instance, when the aircraft's position is 40 NM from the station, use the "yellow" scale (0–50), for this is the smallest scale showing 40 NM. The "blue" (0–200) scale can be used, but it is a little more difficult to locate precisely the 40 NM fix (point) on this scale than it is on the "yellow" (0–50) scale. The grid lines 46 are used to determine the magnetic course from one (1) fix (point) to another fix (point). Since *all* courses and directions taken from the COM-PLOTTER are *magnetic*, there is no conversion to be made from "true" to "magnetic" at any time while plotting courses and figuring headings from the plotter. The magnetic-scale 44 is used to determine the magnetic direction and distance between any two (2) fixes (points). It, too, has four (4) colored scales which match the scales on the plotter. When using the "yellow" (0–50) scale on the plotter, use the "yellow" (0–50) scale on the "magnetic-scale." In each end of this "magnetic-scale" is a permanent magnet, and since the area around the plotter is of metal, the "magnetic-scale" will remain in position when placed on the plotter.

*The computer.*—The computer is the sliding straight-line scale 23 located on the left side of the plotter, FIGURE 1. It utilizes the same principle as does any other time-distance computer, but is built in a straight line, instead of circular, which makes for greater accuracy, and is much easier to read, for you never have to turn the computer "around" so as to read it "right-side-up." The sliding scale 24 on the left is calibrated in miles in FIG. 1. This scale could be calibrated in quantity of fuel or two scales could be used, one calibrated in miles and the other calibrated in quantity of fuel. Only the distance scale is illustrated, to simplify the drawings. Since these scales are not claimed, the fuel scale is not illustrated. The scale on the right is the minute scale 35. By moving the sliding scale to the desired position, very accurate time estimates, or fuel consumption data, can be calculated in a matter of "seconds." Suppose, for illustrative purposes that the aircraft goes 20 miles in 10 minutes. The "20" on scale 24 will be placed opposite the "10" on scale 35. For any other distance, the time can be quickly determined. For example, if the distance is 60 miles, the time will be 30 minutes. Suppose one wishes to know the distance traveled in a given time. From the scales the distance traveled in 20 minutes would be 40 miles. If a fuel scale were substituted for distance scale 24, or used in connection with the distance scale, the use of this fuel scale would be obvious in view of the above. In order to see just how simple it really is to operate the COM-PLOTTER let us work out a couple of problems. Example 1 of the following two problems will show in detail how to use the COM-PLOTTER in aircraft *not* equipped with a DME, while example two will show in detail how to use the COM-PLOTTER in aircraft equipped with a DME (distance measuring equipment).

*Aircraft not equipped with a DME*

When the COM-PLOTTED is used in aircraft without a "DME," the theory of its use is based on the principle of using "lateral" stations, or stations that are located off to one side of the route to be flown. These "lateral" stations become "slaves," when selected, to help navigate along a route. These "slaves" can be VORS, RADIO BEACONS, or RANGE STATIONS, depending, of course, on the type of receiver available in the aircraft. For the only information the "slave" is to furnish, is the "bearing" of the aircraft in relation to the "slave" while flying from one point (fix) to another. At anytime a "bearing" is obtained in relation to a "slave" the position of the aircraft can be determined accurately to be at a precise point (fix). In order to explain this, a short X-C (cross country) has been planned from a first station directly to a second station and beyond. It is assumed that prior to making such a flight the pilot will plan the flight completely in detail, in accordance with good operating practices and current FAA regulations. However, only those pertinent to demonstrate the COM-PLOTTER will be used here. From the LOW ALTITUDE CHART (not shown in the appended drawings) all information that is necessary to plot this flight can be obtained. It is assumed that the second station, third station and first station are connected by airways. Since all airways list courses and distances between intersections and major points, the information that is needed between these three points can be obtained directly from the chart. Assuming that the route between the first station and the second station is not on an airway, a line will be drawn on the chart connecting these two points. Then the course and distance will be determined, and so marked on the chart. The first leg of this flight will be from the first station to the second station. Therefore, the third station will serve as the "slave" station, due to its location, while flying this first leg. Therefore, it will be necessary to know where the first and second stations are in relation to the "slave" so as to be able to plot a departure and arrival point (fix) on the COM-PLOTTER in relation to this "slave." This information is now taken from the chart. It can be readily assumed that the first station bears 068° and is 76 NM from the third station. It can be correctly termed that the first station is located on the 76 NM fix (point) of the 068° radial of the third station. This information is now entered on line 1, at the top 55 of the COM-PLOTTER (FIGURE 1) under FROM. The next thing to determine is the position of the second station in relation to the third station. Assume that the second station bears 005° and is 61 NM from the third station. This position is termed as the 61 NM fix (point) on the 005° radial of the third station. Likewise this information is entered on line 1, at the top 55 of the COM-PLOTTER (FIGURE 1) under TO. Since these two (2) fixes (points) are in relation to the third station, under STATION (FIGURE 1) enter third station. This now completes the necessary information to plot the course from the first station to the second station on the COM-PLOTTER (FIGURES 7 and 8) of the appended drawings which is given in eleven easy steps as follows:

*Steps to plot leg 1 on the COM-PLOTTER—the first station direct to the second station*

Figure 7:
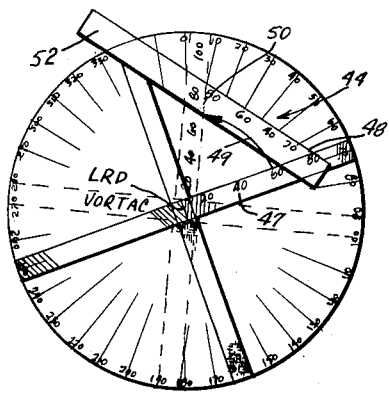
FIGURES 7, 8, 9 and 10 are all top views of the rotating disk part of this invention with necessary scales thereon in various positions for the purpose as later on described in this specification.

(1) Connect the first and second stations with a line.
(2) Determine course and distance between these two (2) points and enter this on the chart.
(3) "Slave" the third station, which places the third station at the center of the PLOTTER (FIGURE 7).
(4) Rotate disc 28 so "red" (0–100) scale 47 is under 070° radial.
(5) Plot fix (point) 48 76 NM (first station).
(6) Rotate disc 28 moving "red" (0–100) scale thru 49 until under 005° radial.
(7) Plot fix (point) 50 61 NM (second station).
(8) Place "magnetic-scale" 52 over these two (2) fixes with "0" (Zero) at 48, FIGURE 7 (second station).
(9) Rotate disk 28 to align grid lines 51 with "magnetic-scale" 52.
(10) Read course from "48" (first station) to "50" (second station) at arrow on "Blue" (0–200) scale at "53."
(11) Course at "53" and distance shown at "54" should correspond to course and distance on chart, if plotted correctly.

It will be noted in the above detailed description of the actual use of this invention that mention has been made of a magnetic-scale 44. This scale is a transparent block of material rectangular in all planes and any desired scale engraved or otherwise noted on each of its faces which are each of a different color. A magnet 56 is embedded in each end of this magentic scale 44 for the purpose of holding the said scale on the invention which, with the exception of the cover plate 32 is steel or its equivalent unless otherwise specified. The aforesaid magnetic scale 44 is clearly shown in FIGURES 4 and 5 of the appended drawings.

It is realized that the cross (member) 30 mentioned in the construction of this invention is actually a plurality of scales of any desired dimensions and that each one of the arms of the member may, if so desired be colored in order to facilitate the reading of the results of the work performed by this invention. It will be noted that different colors have been mentioned for the various scales in the above described use of this COM-PLOTTER.

It is to be understood that the aforementioned grid line 46 as well as any of the other lines and or markings, figures, etc., may be made by any desired method and may even be placed on separate sheets of transparent material and used as a form of overlays on the said rotating disk 28 or any of the other flat parts of this invention if so desired. The lines, markings, figures etc., may also be in colors if one wishes.

Figure 8:
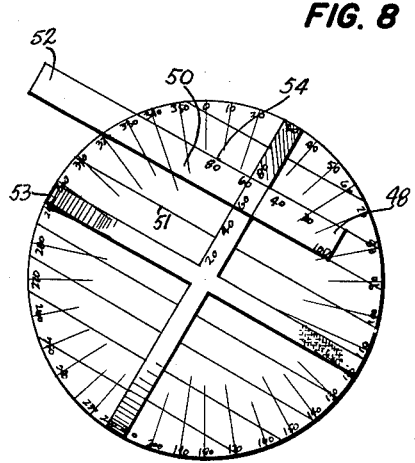
Figure 9:
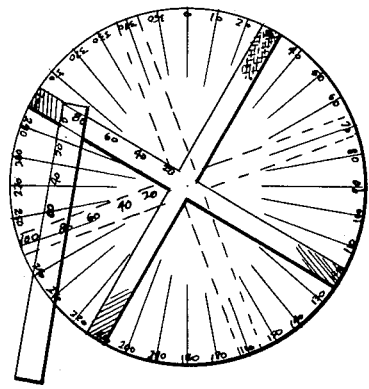
Figure 10:
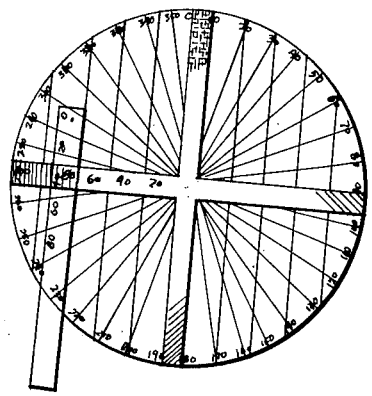

It may be said at this time that FIGURES 9 and 10 of the appended drawings merely show FIGURES 7 and 8 rotated to different positions as applies to the second leg of the flight (cross-country) which has not been shown here, since the first leg adequately demonstrates the use of the COM-PLOTTER. FIGURES 9 and 10 merely show that there are additional positions that can be used with the COM-PLOTTER, which will be understood by those experienced in the navigational instrument art.

In Example two, in aircraft equipped with a DME this COM-PLOTTER is used exactly as described above if the DME fails.

From the foregoing it will now be seen that there is herein provided an improved navigational instrument which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

Having thus described my novel invention, what I claim as new and desire to have secured by Letters Patent is:

1. An invention of the character described, comprising, a base plate, a disk rotatably secured to the base plate, the disk having a plurality of different scales thereon, each scale extending radially from the center of the disk to the circumference, uniformly spaced circular lines, on the disk, said lines connecting said scales, a transparent cover plate over the major portion of the said base plate, the said cover plate being mounted to permit free rotation of the said disk, the transparent cover plate having equally spaced radial lines over the disk to form a compass rose, and a separate elongated member which has as many sides as there are scales on the disks, each side of the elongated member having a scale to match a corresponding scale on the disk.

2. An invention of the character described, comprising, a base plate, a disk rotatably secured to the base plate, the disk having a plurality of different scales thereon, each scale being of a distinctive color and extending radially from the center of the disk to the circumference, uniformly spaced circular lines, on the disk, said lines connecting said scales, a transparent cover plate over the major portion of the said base plate, the said cover plate being mounted to permit free rotation of the said disk, the transparent cover plate having equally spaced radial lines over the disk to form a compass rose, and a separate elongated member which has as many sides as there are scales on the disk, each side of the elongated member having a scale to match, in color and markings, a corresponding scale on the disk.

3. An invention of the character described, comprising, a base plate, a disk rotatably secured to the base plate, the disk having a plurality of different scales thereon, each scale extending radially from the center of the disk to the circumference, uniformly spaced circular lines on the disk, said lines connecting said scales, a plate of magnetic material of the same size as said base plate and mounted on top of the base plate to which it is secured, the said plate having a circular opening in the center thereof to expose the disk, a transparent cover plate over the major portion of the said base plate, the said cover plate being mounted to permit free rotation of the said disk, the transparent cover plate having equally spaced radial lines over the disk to form a compass rose, and a separate elongated member which has as many sides as there are scales on the disk, each side of the elongated member having a scale to match a corresponding scale on the disk, the elongated member including permanently magnetized material to retain the elongated member wherever it is placed on said plate of magnetic material.

4. An invention of the character described, comprising, a base plate, a disk rotatably secured to the base plate, the disk having a plurality of different scales thereon, each scale extending radially from the center of the disk to the circumference, uniformly spaced circular lines on the disk, said lines connecting said scales, a transparent cover plate over the major portion of the said base plate, the said cover plate being mounted to permit free rotation of the said disk, the transparent cover plate having equally spaced radial lines over the disk to form a compass rose, and a separate elongated member which has as many sides as there are scales on the disk, each side of the elongated member having a scale to match a corresponding scale on the disk, the underside of the base plate being contoured to fit the leg of a person when the person is sitting down and a strap to secure the base plate to a person's leg.

5. An invention of the character described, comprising, a base plate, a disk rotatably secured to the base plate, the disk having a plurality of different scales thereon, each scale being of a distinctive color and extending radially from the center of the disk to the circumference, uniformly spaced circular lines, on the disk, said lines connecting said scales, a plate of magnetic material of the same size as said base plate and mounted on top of the base plate to which it is secured, the said plate having a circular opening to expose the disk, a transparent cover plate over the major portion of the said base plate, the said cover plate being mounted to permit free rotation of the said disk, the transparent cover plate having equally spaced radial lines over the disk to form a compass rose, and a separate elongated member which has as many sides as there are scales on the disk, each side of the elongated member having a scale to match, in color and markings, a corresponding scale on the disk, the elongated member including permanently magnetized material to retain the elongated member wherever it is placed on said plate of magnetic material.

References Cited by the Examiner
UNITED STATES PATENTS

| | | | |
|---|---|---|---|
| 2,076,242 | 4/37 | Marquis | 235—85 |
| 2,141,350 | 12/38 | Evans | 33—78 |
| 2,425,097 | 8/47 | Isom | 235—84 X |
| 2,465,238 | 3/49 | Laux | 235—85 |
| 2,482,818 | 9/49 | Walters | 40—129 |
| 2,546,641 | 3/51 | Llanso | 235—61 |
| 2,867,381 | 1/59 | Clapp | 235—61 |
| 2,961,156 | 11/60 | Carter | 235—61 |

LEO SMILOW, *Primary Examiner.*